United States Patent [19]
Igarashi et al.

[11] Patent Number: 5,496,589
[45] Date of Patent: Mar. 5, 1996

[54] CURING COMPOSITION AND METHOD FOR IMPREGNATING WOOD

[75] Inventors: Ichiro Igarashi; Hiroyuki Ota, both of Aichi; Yoshio Mizoguchi, Nagano, all of Japan

[73] Assignee: Toagosei Chemical Industry Co., Ltd., Tokyo, Japan

[21] Appl. No.: 215,722

[22] Filed: Mar. 22, 1994

[30] Foreign Application Priority Data

Mar. 23, 1993 [JP] Japan ................. 5-088055
Mar. 24, 1993 [JP] Japan ................. 5-089382

[51] Int. Cl.$^6$ ............................... B05D 3/00
[52] U.S. Cl. ............. 427/331; 528/87; 528/99; 528/103; 528/112; 427/208.2; 427/209; 427/210; 427/256
[58] Field of Search ................. 528/87, 99, 103, 528/112; 427/208.2, 209, 210, 256, 331

[56] References Cited

U.S. PATENT DOCUMENTS

| | | | |
|---|---|---|---|
| 3,380,831 | 4/1968 | Cohen et al. | 430/288 |
| 4,180,474 | 12/1979 | Schuster et al. | 252/188.3 R |
| 4,528,307 | 7/1985 | Fuhr et al. | 523/440 |
| 4,605,698 | 8/1986 | Briden | 524/559 |
| 4,933,428 | 6/1990 | Piepho et al. | 528/272 |
| 5,288,767 | 2/1994 | Cramer et al. | 521/147 |

OTHER PUBLICATIONS

A. Howell, "Trends in Low Viscosity Acrylate Resins for Radiation Cured Formulations", *Radiation Curing of Polymers II*, pp. 269–283.

M. A. Khan and K. M. Adriss Ali, "Studies of Physico–Mechanical Properties of Wood and Wood Plastic Composite (WPC)", *Journal of Applied Polymer Science*, pp. 167–172 (1992).

*Primary Examiner*—Samuel A. Acquah
*Attorney, Agent, or Firm*—Sughrue, Mion, Zinn, Macpeak & Seas

[57] ABSTRACT

A curing composition and a method for impregnating wood using the curing composition, which comprises a reaction product represented by formula (1) obtained by reacting an alkylene oxide adduct of a hydrocarbon polyol and (meth)acrylic acid:

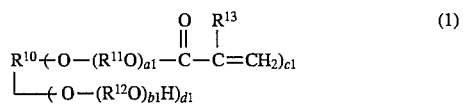

wherein $R^{10}$ represents a residual group of a hydrocarbon polyol having from 3 to 15 carbon atoms and (c1+d1) hydroxyl groups; $R^{11}$ represents an alkylene group having from 2 to 4 carbon atoms; $R^{12}$ represents an alkylene group having from 2 to 4 carbon atoms; $R^{13}$ represents a hydrogen atom or a methyl group; a1 represents a number of from 0 to 10; b1 represents a number of from 0 to 10; c1 represents a number of not less than 1.5; and d1 represents a number of not less than 0.5; provided that (a1+b1) is not less than 1.

17 Claims, No Drawings

CURING COMPOSITION AND METHOD FOR IMPREGNATING WOOD

FIELD OF THE INVENTION

This invention relates to a curing composition providing a cured product on radical polymerization and more particularly a curing composition which easily cures on irradiation of active energy rays, such as ultraviolet rays or electron rays, or heating, and is widely useful as coatings, inks, adhesives, etc. The invention also relates to a method for impregnating wood with a curing composition for improving various properties of wood. The method is applicable to modification of wood for use as house furnishings and construction materials.

BACKGROUND OF THE INVENTION

Curing compositions that cure on application of active energy rays, such as ultraviolet rays or electron beams, or heat energy, are broadly used on account of their advantages over solution type curing compositions which are hardened by removing solvents in terms of resources saving, non-environmental pollution, rapid curing, and the like advantages.

In general, active energy ray-curing compositions mainly comprise a (meth)acrylate type prepolymer, such as polyester (meth)acrylate, urethane (meth)acrylate, epoxy (meth)acrylate or polyether (meth)acrylate; or a resin or prepolymer of an unsaturated polyester, etc., and further comprise a reactive diluent, such as a (meth)acrylate having one (meth)acryloyl group (e.g., phenoxyethyl (meth)acrylate or carbitol (meth)acrylate) or a polyol poly(meth)acrylate (e.g., trimethylolpropane tri(meth)acrylate or tripropylene glycol di(meth)acrylate). The viscosity, curability, and adhesiveness of the active energy ray-curing compositions can be improved by appropriately selecting the reactive diluent. However, conventional active energy ray-curing compositions exhibit large volume shrinkage upon curing, and therefore adhesiveness to a substrate is insufficient. Thus, when the conventional compositions are used as an adhesive, materials that can be adhered are restricted.

Known compositions that cure on heating include those comprising an unsaturated polyester and styrene, as well as the above-mentioned (meth)acrylate type compositions. However, these compositions have a low curing rate and give off an offensive odor. When these compositions are used as an adhesive in particular, there are problems in that satisfactory shear strength is not obtained or the adhesive joint tends to be separated.

The present inventors have conducted extensive investigations for the purpose of developing a curing composition which provides a cured product excellent in hardness and adhesion and, when used as an adhesive in particular, provides an adhesive joint which has sufficient shear strength and undergoes no separation.

In the meantime, it is known that properties of wood, such as dimensional stability, resistance to water absorption, and wear resistance, can be improved by impregnating wood with a curing composition and then curing the composition. The resulting wood-plastic composite material called a wood-plastic combination (WPC) is utilized as various construction materials.

As the curing compositions for WPC, curing compositions comprising unsaturated polyesters dissolved in monomers such as styrene and methyl methacrylate are known. However, since such compositions have hydrophobic properties, there are problems in that they cannot be impregnated sufficiently into the inside of wood, failing to impart the described property. Further, the monomers remain uncured in impregnated wood due to their poor reactivity. It follows that the uncured monomers are incorporated into the wood, which gives rise to a problem of offensive odor upon cutting or polishing after curing.

In order to overcome the above problems, use of an aqueous emulsion of a hydrophobic (meth)acrylate type oligomer of lower volatility as an impregnation composition has been studied as described in JP-A-55-118804 (the term "JP-A" as used herein means an "unexamined published Japanese patent application"). Examples of the hydrophobic (meth)acrylate type oligomer include (meth)acrylate compounds obtained by addition of phenyl glycidyl ether with (meth)acrylic acid, and (meth)acrylate type oligomer obtained by addition of a condensate of phthalic acid and diethylene glycol with (meth)acrylic acid. However, since the (meth)acrylate type oligomers described in JP-A-55-118804 have high hydrophobic properties, their impregnation into wood is not satisfactory.

An aqueous solution of a water-soluble (meth)acrylate type oligomer is also suggested in JP-A-4-82707 for the same purpose as the above aqueous emulsion of hydrophobic (meth)acrylate type oligomer. Examples of the water-soluble (meth)acrylate type oligomer include those obtained by copolymerizing a hydrophilic component such as an alkali metal salt of (meth)acrylic acid with other (meth)acrylic compounds. In this case, however, a cured product of the oligomer also has hydrophilic properties on account of the water-solubility of the oligomer, failing to impart water and moisture resistance to wood.

Hence, the present inventors have conduced extensive investigations in order to develop a curing composition for impregnation of wood which has low volatility and is easy to handle, exhibits excellent wood impregnation properties and high reactivity, and is therefore capable of imparting moisture resistance and dimensional stability to wood.

Throughout the specification and claims, the term "(meth)acrylic acid" means acrylic acid or methacrylic acid; the term "(meth)acrylate" means an acrylate or a methacrylate; and the term "(meth)acryloyl group" means an acryloyl group or a methacryloyl group.

SUMMARY OF THE INVENTION

An object of the present invention is to provide a curing composition which easily cures on irradiation of active energy rays, such as ultraviolet rays or electron rays, or on heating, and is suitable for various applications, such as coatings, inks and adhesives.

Another object of the present invention is to provide a method for impregnating wood to furnish improved wood useful as house furnishings and construction materials.

Other objects and effects of the present invention will be apparent from the following description.

The present invention relates to a curing composition (hereinafter referred to as "curing composition (I)") comprising a reaction product represented by formula (1) obtained by reacting an alkylene oxide adduct of a hydrocarbon polyol and (meth)acrylic acid:

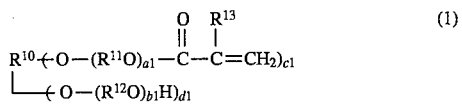

wherein $R^{10}$ represents a residual group of a hydrocarbon polyol having from 3 to 15 carbon atoms and (c1+d1) hydroxyl groups; $R^{11}$ represents an alkylene group having from 2 to 4 carbon atoms; $R^{12}$ represents an alkylene group having from 2 to 4 carbon atoms; $R^{13}$ represents a hydrogen atom or a methyl group; a1 represents a number of from 0 to 10; b1 represents a number of from 0 to 10; c1 represents a number of not less than 1.5; and d1 represents a number of not less than 0.5; provided that (a1+b1) is not less than 1.

The present invention also relates to a method for impregnating wood comprising the steps of: impregnating wood with the above-described curing composition (I); and curing the curing composition (I) thus impregnated.

The present invention also relates to a method for impregnating wood comprising the steps of: impregnating wood with a curing composition (hereinafter referred to as "curing composition (II)"); and curing the curing composition (II) thus-impregnated, the curing composition (II) comprising a reaction product represented by formula (2) obtained by reacting an alkylene oxide adduct of a hydrocarbon polyol and (meth)acrylic acid:

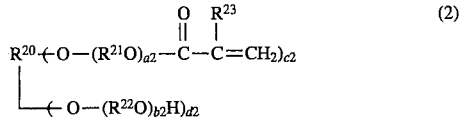

wherein $R^{20}$ represents a residual group of a hydrocarbon polyol having from 3 to 15 carbon atoms and (c2+d2) hydroxyl groups; $R^{21}$ represents an alkylene group having from 2 to 4 carbon atoms; $R^{22}$ represents an alkylene group having from 2 to 4 carbon atoms; $R^{23}$ represents a hydrogen atom or a methyl group; a2 represents a number of from 0 to 10; b2 represents a number of from 0 to 10; c2 represents a number of from 1.5 to 3; and d2 represents a number of not less than 0 and less than 0.5; provided that (a2+b2) is not less than 1.

DETAILED DESCRIPTION OF THE INVENTION

The curing composition (I) of the present invention is a novel composition, which is described in detail below.

The reaction product represented by formula (1) which is used in the curing composition (I) is an esterification product between 1 mol of an alkylene oxide adduct of a hydrocarbon polyol having (c1+d1) hydroxyl groups and c1 mols of (meth)acrylic acid. While the amount of (meth)acrylic acid to be reacted is theoretically c1 mols per mol of the alkylene oxide adduct of a hydrocarbon polyol, the amount of the (meth)acrylic acid to be charged is subject to variation in actually carrying out the reaction, with the reactivity of both reactants being taken into consideration.

The alkylene oxide adduct of a hydrocarbon polyol is an addition reaction product between a hydrocarbon polyol and an alkylene oxide having from 2 to 4 carbon atoms.

The term "hydrocarbon polyol" used herein means a polyol containing no hetero-atom other than carbon atoms, hydrogen atoms, and hydroxyl groups. The residual group of the hydrocarbon polyol obtained by eliminating all the hydroxyl groups contained therein is a hydrocarbon group containing no hetero-atom other than carbon atoms and hydrogen atoms.

Examples of the hydrocarbon polyol used in the present invention include those containing at least two hydroxyl groups such as a diol, a triol, a tetraol, and the like.

The hydrocarbon polyol preferably has a molecular weight of 260 or less. Those having a molecular weight of more than 260 tend to be sometimes difficult to be handled because of their high viscosity.

Preferred examples of the hydrocarbon polyol include a polyol having 3 or more hydroxyl groups and a diol having from 5 to 15 carbon atoms.

Examples of diols used as the hydrocarbon polyol of the present invention include propylene glycol, butanediol, pentanediol, hexanediol, heptanediol, octanediol, nonanediol, decanediol, neopentyl glycol, cyclohexanedimethanol, cyclohexanediol, bisphenol A, bisphenol F, hydrogenated bisphenol A, and hydrogenated bisphenol F.

Examples of polyols having 3 or more of hydroxyl groups used as the hydrocarbon polyol of the present invention include trimethylolpropane, trimethylolethane, glycerin, pentaerythritol, and sorbitol.

In formula (1), the group represented by $R^{10}$ is a group obtained by eliminating the hydroxyl groups from the hydrocarbon polyol.

Specific examples of the alkylene oxide having 2 to 4 carbon atoms include ethylene oxide, propylene oxide, and butylene oxide. Values a1 and b1 in formula (1) representing the amount of the alkylene oxide added to one hydroxyl group of the hydrocarbon polyol each should be a number of from 0 to 10. If a1 or b1 exceeds 10, a cured product has a reduced crosslinking density and thereby reduced hardness.

$R^{11}$ and $R^{12}$ in formula (1) each is an alkylene group derived from the above-mentioned alkylene oxide.

The reaction product which can be used in the present invention can be obtained through a commonly known esterification reaction between the above-mentioned an alkylene oxide adduct of a hydrocarbon polyol and (meth)acrylic acid. In some detail, an alkylene oxide adduct of a hydrocarbon polyol, (meth)acrylic acid, an acid catalyst (e.g., p-toluenesulfonic acid or sulfuric acid), and a polymerization inhibitor (e.g., hydroquinone, hydroquinone monomethyl ether, catechol or phenothiazine) are mixed in an organic solvent (e.g., benzene, toluene, xylene or cyclohexane), and the mixture is heated while stirring to effect esterification. A water-insoluble or sparingly water-soluble organic solvent is preferably used because it facilitates separation of by-produced water and easy progress of the reaction. The resulting product is purified in a usual manner, for example, by washing with water and removing the solvent by distillation under reduced pressure.

The resulting reaction product may not be a single compound but a composition comprised of a plurality of compounds having different chemical structures. Accordingly, values a1, b1, c1, and d1 in formula (1) are each an average of a composition of compounds.

To take an instance, where 1 mol of an adduct obtained by adding 3 mols of ethylene oxide to 1 mol of trimethylolpropane is reacted with 2 mols of acrylic acid, a reaction product is obtained in which both a1 and b1 are 1, c1 is 2, and d1 is 1. In this case, the trimethylolpropane-ethylene oxide adduct mainly comprises a compound with one molecule of ethylene oxide added to each of the three hydroxyl groups of trimethylolpropane and additionally contain a compound with two or more molecules of ethylene oxide added to only one hydroxyl group, a compound with one molecule of ethylene oxide added to only one hydroxyl group, a compound with one molecule of ethylene oxide added to each of two hydroxyl groups, and so forth, totally giving an average 1 as a1 and b1 values. Reaction between 1 mol of this adduct and 2 mols of acrylic acid also results in production of a plurality of compounds. In the case of the adduct with one molecule of ethylene oxide added to each of the three hydroxyl groups of trimethylolpropane, the reaction product comprises a compound with one molecule of acrylic acid added to each of 2 out of 3 hydroxyl groups (c1=2, d1=1) as a main product and, at the same time, a compound with one molecule of acrylic acid added (c1=1, d1=2), a compound with three molecules of acrylic acid added (c1=3, d1= 0), etc., thus giving an average 2 as c1 value and an average 1 as d1 value.

In formula (1), the reaction product which can be used in the curing composition (I), (a1+b1) must be 1 or greater, that is, the reaction product should have at least one molecule of an alkylene oxide per molecule. If (a1+b1) is less than 1, the composition exhibits large volume shrinkage upon curing and poor adhesion to a substrate. When it is used as an adhesive, the adhesive joint does not have satisfactory shear strength or separated from the substrate.

The compounds constituting the reaction product of formula (1) should have a c1 value, indicating the average number of (meth)acryloyl groups per molecule, of at least 1.5, and preferably from 1.8 to 5. If c1 is less than 1.5, the composition has reduced curing reactivity. If it exceeds 5, there tends to be a fear that adhesion to a substrate may be reduced on account of considerable shrinkage upon curing. The value d1, indicating the average number of hydroxyl groups per molecule, should be at least 0.5, and preferably from 1 to 3. If d1 is less than 0.5, the composition has reduced adhesion to a substrate. When it is used as an adhesive, the adhesive joint will be separated. If d1 exceeds 3, the cured product of the composition tends to have a low glass transition point, sometimes resulting in inferior film-forming properties.

In formula (1), (a1×c1+b1× d1) value, indicating the average number of alkylene oxide moieties per molecule, is preferably from 2 to 10. If it is less than 2, the composition tends to have insufficient adhesion to a substrate due to large shrinkage on curing. If it exceeds 10, a cured product of the composition tends to have a low crosslinking degree, sometimes failing to manifest sufficient hardness, or the composition tends to have a low curing rate.

In the curing composition (I) of the present invention, the above-mentioned reaction products may be used either individually or in combination of two or more thereof.

If desired, the curing composition (I) of the present invention may contain other various components. For example, an organic solvent, water, or a reactive diluent may be added for the purpose of decreasing the viscosity of the composition.

Examples of the organic solvents include ketones, e.g., methyl ethyl ketone and methyl isobutyl ketone; acetic esters, e.g., ethyl acetate and butyl acetate, aromatic hydrocarbons, e.g., toluene and xylene; alcohols, e.g., methanol and isopropyl alcohol; cellosolves, e.g., methyl cellosolve and ethyl cellosolve; and cellosolve acetates, e.g., methyl cellosolve acetate and ethyl cellosolve acetate. These organic solvents may be used either individually or in combination thereof.

Examples of the reactive diluents include compounds having a (meth)acryloyl group in the molecule thereof. In particular, those having a viscosity of not higher than 50 cps at 25° C. are preferred in view of their effects in reducing the viscosity of the composition. The compounds having a (meth)acryloyl group in the molecule are commercially available, which include Viscoat 150 (tetrahydrofurfuryl acrylate, produced by Osaka Yuki Kagaku Kogyo Co., Ltd.), Aronix M101 (phenoxyethoxyethyl acrylate, produced by Toa Gosei Chemical Industry Co., Ltd.), Viscoat 215 (neopentyl glycol diacrylate, produced by Osaka Yuki Kagaku Kogyo Co., Ltd.), and Viscoat 230 (hexanediol diacrylate, produced by Osaka Yuki Kagaku Kogyo Co., Ltd.). The reactive diluent may be used either individually or in combination of two or more thereof.

The curing composition (I) of the present invention can be used for impregnation of wood as described later. In such a use, the curing composition (I) preferably contains a (meth)acrylate having a molecular weight of not more than 500 and containing one (meth)acryloyl group and one hydroxyl group or carboxyl group per molecule (hereinafter referred to as "(meth)acrylate II"), which is described later in detail, as a reactive diluent.

The amount of the reactive diluent, if used, is preferably not more than 100 parts by weight per 100 parts by weight of the reaction product. The amount of the organic solvent or water, if used, is preferably not more than 100 parts by weight per 100 parts by weight of the total amount of the reaction product and the reactive diluent (the reaction product and the reactive diluent will hereinafter be inclusively referred to as "curing components").

If desired, the curing composition (I) of the present invention may contain stabilizers for the purpose of improving storage stability while preventing gelation during storage. Examples of the stabilizers include phenols, e.g., hydroquinone, hydroquinone monomethyl ether, t-butylhydroquinone and catechol; quinones, e.g., benzoquinone, naphthoquinone and diphenylbenzoquinone; phenothiazine, copper salts, and aluminum N-nitrophenylhydroxylamine. The amount of the stabilizers is preferably from 0.00001 to 0.01 part by weight per 100 parts by weight of the curing components.

The curing composition (I) can be cured through various means, for example, by heat or light application in the presence or absence of a polymerization initiator.

Where the composition is thermally cured by means of a heat energy source, such as a heating furnace, infrared rays or microwaves, a thermal polymerization initiator is generally added to the composition. Examples of the thermal polymerization initiators include azo compounds (e.g., azobisisobutyronitrile); organic peroxides, such as ketone peroxides (e.g., methyl ethyl ketone peroxide and cyclohexanone peroxide), hydroperoxides (e.g., diisopropylbenzene hydroperoxide), alkyl peroxides (e.g., dicumyl peroxide), acyl peroxides (e.g., benzoyl peroxide and toluoyl peroxide), and peroxy esters (e.g., cumyl peroxyoctoate and butyl peroxyisobutyrate); and inorganic peroxides (e.g., ammonium peroxosulfate).

Where the composition is cured by allowing to stand at ambient temperature or by heating at a relatively low temperature of not higher than 100° C., it is preferable to use a polymerization accelerator in combination with the above-mentioned thermal polymerization initiator. Examples of the polymerization accelerators include organometallic salts composed of a metal (e.g., cobalt, iron or manganese) and naphthenic acid, linolic acid or acetylacetone; reducing amines, e.g., dimethyl-p-toluidine and ascorbic acid; and other reducing substances.

Where the composition is cured by irradiation of ultraviolet rays or visible rays, a known photopolymerization initiators or sensitizers are generally added to the composition. Examples of the photopolymerization initiators include benzophenone and its derivatives, benzoin, benzoin alkyl ethers, 2-methyl[4-(methylthio)phenyl]-2-morpholino-1-propanone, benzyldimethyl ketal, 1-hydroxycyclohexyl phenyl ketone, and 2-hydroxy-2-methyl-1-phenylpropan-1-one.

Where the curing composition (I) is cured by a combination of photopolymerization and thermal polymerization, the above-mentioned photopolymerization initiator and thermal polymerization initiator may be used in combination.

The amounts of the thermal polymerization initiator, polymerization accelerator, photopolymerization initiator, and sensitizer can be selected in a usual manner. For example, they are used in a total amount of from 0.01 to 20 parts by weight per 100 parts by weight of the curing components. If the total amount is less than 0.01 part by weight, the composition does not undergo thorough polymerization. If it exceeds 20 parts by weight, the proportion of the curing components becomes relatively low, which tends to result in deterioration of characteristics of the cured product. A particularly preferred amount of the initiator to be used is from 0.1 to 10 parts by weight per 100 parts by weight of the curing composition.

Where the curing composition (I) is cured by irradiation of electron beams or radiations, a polymerization initiator may not be used.

If desired, the curing composition (I) may further contain other conventional additives, such as dyes, pigments, and fillers for adjustment of impregnation degree.

The method for impregnating wood according to the present invention is next described in detail below.

In the method for impregnating wood of the present invention, the above-described curing composition (I) and/ or the curing composition (II) is impregnated in wood, and then the curing composition thus impregnated is cured.

The curing composition (II) used in the present invention is the same as the curing composition (I) according to the present invention, except that the average number of hydroxyl groups in the reaction product (d1 or d2) is not less than 0 and less than 0.5, and the average number of (meth)acryloyl groups (c1 or c2) is limited to the range of from 1.5 to 3. Therefore, as the other subject matters of the curing composition (II) such as the components, e.g., the hydrocarbon polyol, the reactive diluent, the additives, etc., the method for producing the composition, and the like, those described for the curing composition (I) above can be applied to the curing composition (II).

A curing composition, in which the average number of hydroxyl groups (d1 or d2) is not less-than 0 and less than 1.5 and the average number of (meth)acryloyl groups (c1 or c2) is more than 3, has too higher hydrophobic property and is insufficient in impregnation of wood.

In the curing composition (I) and the curing composition (II) that are used in the method for impregnating wood according to the present invention, it is preferred to use a (meth)acrylates having a molecular weight of not more than 500 and containing one (meth)acryloyl group and one hydroxyl group or carboxyl group per molecule ((meth)acrylate II) as a reactive diluent. Compounding of (meth)acrylate II with the reaction product reduces the viscosity of the composition and brings about further improvements in impregnation properties, moisture resistance, and dimensional stability.

(Meth)acrylates II have a molecular weight of not more than 500, preferably not more than 300, and more preferably not more than 200. Those having a molecular weight exceeding 500 exhibit reduced polarity and therefore deteriorated penetration property into the xylem of wood. (Meth)acrylates II should have one hydroxyl group or carboxyl group per one molecule. Those having one hydroxyl group and one carboxyl group per molecule and those having two or more hydroxyl groups or carboxyl groups per molecule make the resulting composition too polar to fill up vessels of wood.

The following compounds are mentioned as examples of (meth)acrylate II:

(1) Hydroxyalkyl (Meth)acrylates:

(Meth)acrylates having one (meth)acryloyl group and one hydroxyl group which are obtained by reacting (meth)acrylic acid and a diol or an alkylene oxide. Included are hydroxyethyl (meth)acrylate, hydroxypropyl (meth)acrylate, hydroxybutyl (meth)acrylate, polyethylene glycol monohydroxymono(meth)acrylate, and polypropylene glycol monohydroxymono(meth)acrylate.

(2) Ring-open Addition Product of Lactone to (Meth)acrylic Acid:

(Meth)acrylates having one (meth)acryloyl group and one carboxyl group which are obtained by ring-open addition of one molecule of a lactone or ring-open addition polymerization of two or more molecules of a lactone to (meth)acrylic acid. The lactone includes caprolactone and valerolactone. Included in the (meth)acrylates II (2) is Aronix M5300, an acrylic acid-caprolactone adduct produced by Toa Gosei Chemical Industry Co., Ltd.

(3) Ring-open Addition Product of Lactone to Hydroxyalkyl (Meth)acrylate:

(Meth)acrylates having one (meth)acryloyl group and one hydroxyl group which are obtained by ring-open addition of one molecule of a lactone or ring-open addition polymerization of two or more molecules of a lactone to hydroxyalkyl (meth)acrylate. Included are a hydroxyethyl (meth)acrylate-caprolactone adduct and a hydroxyethyl (meth)acrylate-valerolactone adduct.

(4) (Meth)acrylic Acid-Glycidyl Ether Adducts:

(Meth)acrylates having one (meth)acryloyl group and one hydroxyl group which are obtained by addition of a glycidyl ether to (meth)acrylic acid. The glycidyl ether includes phenyl glycidyl ether and butyl glycidyl ether. Included in (meth)acrylates II (4) is Aronix M5700, an acrylic acid-phenyl glycidyl ether adduct produced by Toa Gosei Chemical Industry Co., Ltd.

(5) Polymers of (Meth)acrylic Acid or Acrylate:

Included are dimers, trimers or tetramers of acrylic acid having one (meth)acryloyl group and one carboxyl group and dimers, trimers or tetramers of hydroxyethyl (meth)acrylate having one (meth)acryloyl group and one hydroxyl group. An acrylic acid dimer is commercially available as Aronix M5600 (produced by Toa Gosei Chemical industry Co., Ltd).

(Meth)acrylate II is preferably added in an amount of from 1 to 70% by weight, and more preferably from 5 to 50% by weight, based on the total amount of the reaction product and (meth)acrylate II. A composition containing more than 70% by weight of (meth)acrylate II tends to be undercured in wood. If the amount of (meth)acrylate II is less than 1% by weight, effects of addition are insubstantial.

The method for impregnating the curing composition into wood can be carried out through various conventional manners, for example, vacuum impregnation, pressure impregnation, and atmospheric immersion.

The method of the present invention is applicable to varieties of wood, i.e., broad-leaved trees, conifers and so forth.

The depth of impregnation into wood is not particularly limited and is appropriately decided according to the purpose. Since the curing composition of the present invention exhibits excellent impregnation properties into the xylem and vessels of wood to provide a cured product excellent in hardness, dimensional stability and moisture resistance, the purpose of improvement is accomplished by impregnating the composition only into the surface layer of wood. This means reduction of the requisite amount of the composition and is therefore economical. A preferred depth of impregnation is 1 mm or more, and particularly 3 mm or more.

As the method for curing the curing composition thus-impregnated into wood, the various methods as described for the curing methods for the curing composition (I) above can be similarly applied. That is, the impregnated curing composition can be cured by heating or light such as ultraviolet ray or visible light in the presence of a polymerization initiator, or by irradiating with electron beams or radiations. The method for curing by heating, the method for curing by light, and the kind and amount of polymerization initiators used therein may be the same as those described for the curing method for the curing composition (I) above.

Both a photopolymerization initiator and a thermal polymerization initiator may be used in combination, so that the surface portion of the impregnated wood is cured with light, and the interior of the wood is cured by heating.

The curing composition to be used in the impregnation method of the present invention possesses great advantages as follows: (1) Having well-balanced polarity, the composition easily penetrates into the xylem and also keeps filling the vessels of wood even after curing. (2) Having a small volume shrinkage upon curing, the composition does not destroy the wood tissue on curing. (3) Having excellent reactivity, the composition cures with ease and, after curing, is fixed in the xylem and vessels of wood without bleeding. (4) The cured product of the composition has high hardness sufficient for reinforcing wood.

Accordingly, the impregnation method according to the present invention achieves excellent impregnation into wood and imparts dimensional stability and moisture resistance to wood.

The present invention will now be illustrated in greater detail with reference to Synthesis Examples, Examples and Comparative Examples, but it should be understood that the present invention is not construed as being limited thereto. All the parts and percents are by weight unless otherwise specified.

SYNTHESIS EXAMPLE 1

In a flask equipped with a stirrer, a thermometer, and a water separator with a condenser at the top thereof were charged 270 g (1 mol) of a trimethylolpropane-ethylene oxide 3 mol adduct (average molecular weight: 270), 144 g (2 mol) of acrylic acid, 17 g (corresponding to 2% of the total reactants) of p-toluenesulfonic acid as a catalyst, 0.2 g (corresponding to 250 ppm based on the total reactants) of hydroquinone monomethyl ether as a polymerization inhibitor, and 414 g (corresponding to 50% of the total reactants) of toluene as a solvent. The mixture was heated to 110° C. for 5 hours while stirring to conduct dehydrating esterification. The amount of water collected in the water separator was 34 g. After completion of the reaction, the reaction mixture was washed with water, and toluene was removed therefrom by distillation under reduced pressure to obtain a reaction product mainly comprising a diacrylate of the trimethylolpropane-ethylene oxide 3.0 mol adduct, which was designated composition A.

The reaction product above prepared is represented by formula (1) wherein $R^{10}$ is a trimethylolpropane residue (carbon atom number: 6); $R^{11}$ and $R^{12}$ are both an ethylene group (carbon atom number: 2); $R^{13}$ is a hydrogen atom; a1 is 1.0; b1 is 1.0; c1 is 1.9; and d1 is 1.1.

SYNTHESIS EXAMPLE 2

Dehydrating esterification was carried out in the same manner as in Synthesis Example 1, except for using 310 g (1 mol) of a trimethylolpropane-propylene oxide 3.0 mol adduct (average molecular weight: 310), 144 g (2 mol) of acrylic acid, 18 g (2% based on the total reactants) of p-toluenesulfonic acid as a catalyst, 0.2 g (250 ppm based on the total reactants) of hydroquinone monomethyl ether as a polymerization inhibitor, and 454 g (50% of the total reactants) of toluene as a solvent. The amount of water collected in the water separator was 36 g. The reaction mixture was treated in the same manner as in Synthesis Example 1 to obtain a reaction product mainly comprising a diacrylate of the trimethylolpropane-propylene oxide 3.0 mol adduct, which was designated composition B.

The reaction product above prepared is represented by formula (1) wherein $R^{10}$ is a trimethylolpropane residue (carbon atom number: 6); $R^{11}$ and $R^{12}$ are each a propylene group (carbon atom number: 3); $R^{13}$ is a hydrogen atom; a1 is 1.0; b1 is 1.0; c1 is 2.0; and d1 is 1.0.

SYNTHESIS EXAMPLE 3

Dehydrating esterification was carried out in the same manner as in Synthesis Example 1, except for using 435 g (1 mol) of a ditrimethylolpropane-ethylene oxide 4.2 mol adduct (average molecular weight: 435), 216 g (3 mol) of acrylic acid, 26 g (2% based on the total reactants) of p-toluenesulfonic acid as a catalyst, 0.3 g (250 ppm based on the total reactants) of hydroquinone monomethyl ether as a polymerization inhibitor, and 651 g (50% of the total reactants) of toluene as a solvent. The amount of water collected in the water separator was 51 g. The reaction mixture was treated in the same manner as in Synthesis Example 1 to obtain a reaction product mainly comprising a triacrylate of the ditrimethylolpropane-ethylene oxide 4.2 mol adduct, which was designated composition C.

The reaction product above prepared is represented by formula (1) wherein $R^{10}$ is a ditrimethylolpropane residue (carbon atom number: 12); $R^{11}$ and $R^{12}$ are each an ethylene group (carbon atom number: 2); $R^{13}$ is a hydrogen atom; a1 is 1.05; b1 is 1.05; c1 is 2.85; and d1 is 1.15.

SYNTHESIS EXAMPLE 4

Dehydrating esterification was carried out in the same manner as in Synthesis Example 1, except for using 683 g (1 mol) of a pentaerythritol-butylene oxide 7.6 mol adduct (average molecular weight: 683), 172 g (2 mol) of methacrylic acid, 34 g (2% based on the total reactants) of p-toluenesulfonic acid as a catalyst, 0.4 g (250 ppm based on the total reactants) of hydroquinone monomethyl ether as a polymerization inhibitor, and 855 g (50% of the total reactants) of toluene as a solvent. The amount of water collected in the water separator was 34 g. The reaction mixture was treated in the same manner as in Synthesis Example 1 to obtain a reaction product mainly comprising a dimethacrylate of the pentaerythritol-butylene oxide 7.6 mol adduct, which was designated composition D.

The reaction product above prepared is represented by formula (1) wherein $R^{10}$ is a pentaerythritol residue (carbon atom number: 5); $R^{11}$ and $R^{12}$ are each a butylene group (carbon atom number: 4); $R^{13}$ is a methyl group; a1, b1, and c1 are each 1.9; and d1 is 2.1.

EXAMPLES 1 TO 4 AND COMPARATIVE EXAMPLES 1 TO 3

The curing compositions shown in Table 1 below were tested in accordance with the test method described below. The compositions to be cured by ultraviolet irradiation were compounded with 2 parts of benzyldimethyl ketal as a photopolymerization initiator per 100 parts of the composition. The results obtained are shown in Table 1.

Test Method:

Each composition was coated on a plate of steel or Japanese oak to a thickness of 10 μm or 30 μm, respectively, and cured by irradiation of ultraviolet rays or electron beams under the following conditions.

UV Irradiation:
  UV lamp: 80 W/cm; high-pressure mercury lamp
  Focal length: 10 cm
  Reflector: condenser type
  Conveyer speed: 5 m/min
  Times of Irradiation: 5

Electron Beams Irradiation:
  Accelerating voltage: 170 kV
  Irradiation dose: 5 Mrad
  Oxygen concentration: 100 to 200 ppm Pencil hardness of the coating film formed on the steel plate was measured according to JIS 5400. Further, the coating film formed on the steel plate or Japanese oak plate was cross-hatched with a cutter knife to make 100 squares in a 10 mm×10 mm area. A cellophane adhesive tape was adhered thereon and rapidly stripped off. The number of squares remaining on the substrate was counted as an index for adhesion.

TABLE 1

| Example No. | Composition | Pencil Hardness | Adhesion Steel | Adhesion Oak | Curing Method[*1] |
|---|---|---|---|---|---|
| Example 1 | A | 4H | 100 | 100 | UV |
| Example 2 | B | 4H | 100 | 100 | UV |
| Example 3 | C | 4H | 95 | 82 | UV |
| Example 4 | D | 4H | 100 | 100 | EB |
| Comparative Example 1 | Aronix M309[*2] | 4H | 0 | 0 | UV |
| Comparative Example 2 | Light Ester TMP[*3] | 4H | 0 | 0 | EB |
| Comparative Example 3 | Aronix M270[*4] | Unmeasurable due to undercure | | | UV |

Note:
[*1]: UV: Ultraviolet ray curing
EB: Electron beams curing
[*2]: Aronix M309: Trimethylolpropane triacrylate (a commercial product produced by Toa Gosei Chemical Industry Co., Ltd.)
[*3]: Light Ester TMP: Trimethylolpropane trimethacrylate (a commercial product produced by Kyoeisha Oil Chemical Industry Co., Ltd.)
[*4]: Aronix M270: Polypropylene glycol diacrylate (a commercial product produced by Toa Gosei Chemical Industry Co., Ltd.)

EXAMPLES 5 AND 6 AND COMPARATIVE EXAMPLES 4 AND 5

100 parts of each of the compositions shown in Table 2 below were mixed with 2 parts of benzoyl peroxide as a thermal polymerization initiator to prepare a curing composition. The composition was coated on a plate of Japanese oak to a thickness of 20 μm, and another Japanese oak plate was laminated thereon. The laminate was heated at 100° C. for 8 hours to prepare a test piece. A tensile shear strength of the test piece was measured in accordance with JIS K6851. The results obtained are shown in Table 2.

TABLE 2

| Example No. | Composition | Tensile Shear Strength (kgf/cm$^2$) |
|---|---|---|
| Example 5 | B | 22 |
| Example 6 | C | 31 |
| Comparative Example 4 | Aronix M309 | 12 |
| Comparative Example 5 | Aronix M270 | undercured |

SYNTHESIS EXAMPLE 5

In Synthesis Example 5 and Synthesis Examples 6 to 8 described later, curing compositions for use in the method for impregnation of wood were prepared.

In a flask equipped with a stirrer, a thermometer, and a water separator with a condenser at the top thereof were charged 285 g (1 mol) of a neopentyl glycol-ethylene oxide 4.1 mol adduct (average molecular weight: 280), 144 g (2 mol) of acrylic acid, 17 g (corresponding to 2% of the total reactants) of p-toluenesulfonic acid as a catalyst, 0.2 g (corresponding to 250 ppm based on the total reactants) of hydroquinone monomethyl ether as a polymerization inhibitor, and 429 g (corresponding to 50% of the total reactants) of toluene as a solvent. The mixture was heated to 110° C. for 5 hours while stirring to conduct dehydrating esterification. The amount of water collected in the water separator was 36 g. After completion of the reaction, the reaction mixture was washed with water, and toluene was removed therefrom by distillation under reduced pressure to obtain a reaction product mainly comprising a diacrylate of the neopentyl glycol-ethylene oxide 4.1 mol adduct. The reaction product was designated composition E.

The reaction product above prepared is represented by formula (2) wherein $R^{20}$ is a neopentyl glycol residue (carbon atom number: 5); $R^{21}$ is an ethylene group (carbon atom number: 2); $R^{23}$ is a hydrogen atom; a2 is 2.05; b2 is 0; c2 is 2.0; and d2 is 0.

SYNTHESIS EXAMPLE 6

Dehydrating esterification was carried out in the same manner as in Synthesis Example 5, except for using 270 g (1 mol) of a trimethylolpropane-ethylene oxide 3.0 mol adduct (average molecular weight: 270), 216 g (3 mol) of acrylic acid, 19 g (2% based on the total reactants) of p-toluenesulfonic acid as a catalyst, 0.2 g (250 ppm based on the total reactants) of hydroquinone monomethyl ether as a polymerization inhibitor, and 486 g (50% based on the total reactants) of toluene as a solvent. The amount of water collected in the water separator was 54 g. The reaction mixture was treated in the same manner as in Synthesis Example 5 to obtain a reaction product mainly comprising a triacrylate of the trimethylolpropane-ethylene oxide 3.0 mol adduct, which was designated composition F.

The reaction product above prepared is represented by formula (2) wherein $R^{20}$ is a trimethylolpropane residue (carbon atom number: 6); $R^{21}$ is an ethylene group (carbon atom number: 2); $R^{23}$ is a hydrogen atom; a2 is 1.0; b2 is 0; c2 is 3.0; and d2 is 0.

SYNTHESIS EXAMPLE 7

Dehydrating esterification was carried out in the same manner as in Synthesis Example 5, except for using 683 g (1 mol) of a pentaerythritol-butylene oxide 3.8 mol adduct (average molecular weight: 683), 172 g (2 mol) of methacrylic acid, 34 g (2% based on the total reactants) of p-toluenesulfonic acid as a catalyst, 0.4 g (250 ppm based on the total reactants) of hydroquinone monomethyl ether as a polymerization inhibitor, and 855 g (50% based on the total reactants) of toluene as a solvent. The amount of water collected in the water separator was 34 g. The reaction mixture was treated in the same manner as in Synthesis Example 5 to obtain a reaction product mainly comprising a dimethacrylate of the pentaerythritol-dibutylene oxide 3.8 mol adduct, which was designated composition G.

The reaction product above prepared is represented by formula (1) wherein $R^{10}$ is a pentaerythritol residue (carbon atom number: 5); $R^{11}$ and $R^{12}$ are each a butylene group (carbon atom number: 4); $R^{13}$ is a methyl group; a1, b1, and c1 are each 1.9; and d1 is 2.1.

SYNTHESIS EXAMPLE 8

Dehydrating esterification was carried out in the same manner as in Synthesis Example 5, except for using 310 g (1 mol) of a trimethylolpropane-propylene oxide 3.0 mol adduct (average molecular weight: 310), 144 g (2 mol) of acrylic acid, 18 g (2% based on the total reactants) of p-toluenesulfonic acid as a catalyst, 0.2 g (250 ppm based on the total reactants) of hydroquinone monomethyl ether as a polymerization inhibitor, and 454 g (50% based on the total reactants) of toluene as a solvent. The amount of water collected in the water separator was 36 g. The reaction mixture was treated in the same manner as in Synthesis Example 5 to obtain a reaction product mainly comprising a diacrylate of the trimethylolpropane-propylene oxide 3.0 mol adduct, which was designated composition H.

The reaction product above prepared is represented by formula (1) wherein $R^{10}$ is a trimethylolpropane residue (carbon atom number: 6); $R^{11}$ and $R^{12}$ are each a propylene group (carbon atom number: 3); $R^{13}$ is a hydrogen atom; a1, b1, and d1 are each 1.0; and c1 is 2.0.

EXAMPLES 7 TO 11 AND COMPARATIVE EXAMPLE 6

100 parts of the composition shown in Table 3 below were mixed with 1 part of benzoyl peroxide as a polymerization initiator to prepare a curing composition for impregnation of wood.

Each of the curing compositions was impregnated into blocks of a beech tree (2×2×10 cm) under reduced pressure and heated at 80° C. for 10 hours to cure the impregnation composition. The resulting impregnated wood blocks were tested as follows. The results obtained are shown in Table 3.

(1) Add-on:

A percent of weight gain of the impregnated wood based on the non-impregnated wood was obtained.

(2) Resistance to Moisture Absorption:

The impregnated wood blocks were kept at 20° C. and 94% RH for 30 days. The moisture-excluding efficiency (MEE) was determined according to the following equation to evaluate resistance to moisture absorption.

$$MSS=(U_0-U)/U_0 \times 100\ (\%)$$

wherein $U_0$ is a rate of moisture absorption (%) of the non-impregnated wood; and U is a rate of moisture absorption (%) of the impregnated wood; the rate of moisture absorption is a rate of change in weight of the wood before and after the test.

(3) Dimensional Stability:

The impregnated wood blocks were conditioned in the same manner as in (2) above, and the anti-swelling efficiency (ASE) was determined according to the following equation to evaluate dimensional stability.

$$ASE=(S_0-S)/S_0 \times 100\ (\%)$$

wherein $S_0$ is a rate of swelling (%) of the non-impregnated wood; and S is a rate of swelling (%) of the impregnated wood; the rate of swelling is a rate of change in volume of the wood before and after the test.

(4) Curing State:

The impregnated wood block was cut, and the cut area was observed with the naked eye. The state of curing in the inside of the block was rated "good", indicating sufficient curing, and "poor", indicating insufficient curing.

TABLE 3

| Example No. | Composition (part) | Add-on (%) | MEE (%) | ASE (%) | Curing State |
|---|---|---|---|---|---|
| Example 7 | E (100) | 41 | 61 | 50 | good |
| Example 8 | F (100) | 55 | 70 | 58 | good |
| Example 9 | G (90) methanol (10) | 49 | 76 | 64 | good |
| Example 10 | H (100) | 62 | 78 | 69 | good |
| Comparative Example 6 | Aronix M113*[1] | 17 | 3 | 8 | poor |

Note:
*[1]: Aronix M113: Acrylate of a nonylphenol-ethylene oxide (4 mol) adduct produced by Toa Gosei Chemical Industry Co., Ltd.

EXAMPLES 11 TO 13 AND COMPARATIVE EXAMPLES 7 AND 8

Examples 11 to 13 were samples in which the curing composition contained a reactive diluent.

100 parts of the composition shown in Table 4 below were mixed with 1 part of benzoyl peroxide as a polymerization initiator to prepare an impregnation composition for wood. Each of the resulting impregnation compositions was evaluated in the same manner as in Example 7. The results obtained are shown in Table 4.

TABLE 4

| Example No. | Composition (part) | Add-on (%) | MEE (%) | ASE (%) | Curing State |
|---|---|---|---|---|---|
| Example 11 | E (90) Aronix M5600*[1] (10) | 48 | 67 | 56 | good |
| Example 12 | F (90) hydroxyethyl methacrylate (10) | 60 | 78 | 68 | good |
| Example 13 | H (90) hydroxypropyl acrylate (10) | 71 | 85 | 72 | good |
| Comparative Example 7 | Aronix M113 (90) Aronix M5600*[1] (10) | 14 | 5 | 10 | poor |

TABLE 4-continued

| Example No. | Composition (part) | Add-on (%) | MEE (%) | ASE (%) | Curing State |
|---|---|---|---|---|---|
| Comparative Example 8 | Aronix M240*2 (90) hydroxyethyl acrylate (10) | 22 | 9 | 17 | good |

Note:
*1: Aronix M5600: Acrylic acid dimer produced by Toa Gosei Chemical Industry Co., Ltd.
*2: Aronix M240: Tetraethylene glycol diacrylate produced by Toa Gosei Chemical Industry Co., Ltd.

The curing composition of the present invention easily cures on irradiation of active energy rays, such as ultraviolet rays and electron beams, or heating to provide a cured product excellent in hardness and adhesion. When used as an adhesive, the composition provides an adhesive joint which has sufficient shear strength and is never separated from a substrate. Therefore, the curing composition is suited to such uses as coatings, inks, and adhesives.

The wood impregnation method according to the present invention which comprises impregnating wood with a curing composition which is excellent in impregnation properties into wood, highly reactive, and easy to handle owing to its low volatility, followed by curing provides wood endowed with moisture resistance, dimensional stability and strength. Therefore, the method is suitable for improvement of wood.

While the invention has been described in detail and with reference to specific examples thereof, it will be apparent to one skilled in the art that various changes and modifications can be made therein without departing from the spirit and scope thereof.

What is claimed is:

1. A method for impregnating wood comprising the steps of: impregnating wood with a curing composition; and curing said curing composition thus impregnated, said curing composition comprising a reaction product represented by formula (1) obtained by reacting an alkylene oxide adduct of a hydrocarbon polyol and (meth)acrylic acid:

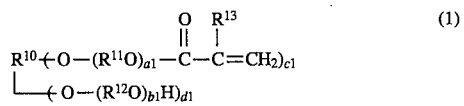

wherein $R^{10}$ represents a residual group of a hydrocarbon polyol having from 3 to 15 carbon atoms and (c1+d1) hydroxyl groups; $R^{11}$ represents an alkylene group having from 2 to 4 carbon atoms; $R^{12}$ represents an alkylene group having from 2 to 4 carbon atoms; $R^{13}$ represents a hydrogen atom or a methyl group; a1 represents a number of from 0 to 10; b1 represents a number of from 0 to 10; c1 represents a number of not less than 1.5; and d1 represents a number of not less than 0.5; provided that (a1+b1) is not less than 1.

2. A method for impregnating wood as claimed in claim 1, wherein said hydrocarbon polyol has a molecular weight of not more than 260.

3. A method for impregnating wood as claimed in claim 1, wherein said hydrocarbon polyol is selected from the group consisting of a polyol having 3 or more hydroxyl groups and a diol having from 5 to 15 carbon atoms.

4. A method for impregnating wood as claimed in claim 1, wherein said hydrocarbon polyol is selected from the group consisting of propylene glycol, butanediol, pentanediol, hexanediol, heptanediol, octanediol, nonanediol, decanediol, neopentyl glycol, cyclohexanedimethanol, cyclohexanediol, bisphenol A, bisphenol F, hydrogenated bisphenol A, and hydrogenated bisphenol F.

5. A method for impregnating wood as claimed in claim 1, wherein said hydrocarbon polyol is selected from the group consisting of trimethylolpropane, trimethylolethane, glycerin, pentaerythritol, and sorbitol.

6. A method for impregnating wood as claimed in claim 1, wherein c1 is from 1.8 to 5; d1 is from 1 to 3; and (a1×c1+b1×d1) is from 2 to 10.

7. A method for impregnating wood as claimed in claim 1, wherein said composition comprises said reaction product and a (meth)acrylate having a molecular weight of not more than 500 and containing one (meth)acryloyl group and one hydroxyl group or carboxyl group per molecule.

8. A method for impregnating wood as claimed in claim 7, wherein said (meth)acrylate is present in an amount of from 1 to 70% by weight, based on the total amount of said reaction product and said (meth)acrylate.

9. A method for impregnating wood as claimed in claim 1, wherein said impregnating is to a depth of 1 mm or more into the wood.

10. A method for impregnating wood as claimed in claim 9, wherein said impregnating of the wood is by vacuum impregnation, pressure impregnation or immersion at atmospheric pressure.

11. A method for impregnating wood as claimed in claim 10, wherein said curing is by the application of heat or light.

12. A method for impregnating wood as claimed in claim 11, wherein said curing is in the presence of a polymerization initiator.

13. A method for impregnating wood as claimed in claim 1, wherein said impregnating is to a depth of 3 mm or more into the wood.

14. A method for impregnating wood as claimed in claim 13, wherein said impregnating of the wood is by vacuum impregnation, pressure impregnation or immersion at atmospheric pressure.

15. A method for impregnating wood as claimed in claim 14, wherein said curing is by the application of heat or light.

16. A method for impregnating wood as claimed in claim 15, wherein said curing is in the presence of a polymerization initiator.

17. A method for impregnating wood as claimed in claim 1, wherein during said impregnating, the weight gain of the impregnated wood based on the non-impregnated wood is 71%.

* * * * *